(12) United States Patent
Clarksean

(10) Patent No.: US 7,096,929 B2
(45) Date of Patent: Aug. 29, 2006

(54) PCM (PHASE CHANGE MATERIAL) SYSTEM AND METHOD FOR SHIFTING PEAK ELECTRICAL LOAD

(75) Inventor: Randy Lee Clarksean, New York Mills, MN (US)

(73) Assignee: Leading Technology Designs, Inc., New York Mills, MN (US)

( * ) Notice: Subject to any disclaimer, the term of this patent is extended or adjusted under 35 U.S.C. 154(b) by 173 days.

(21) Appl. No.: 10/400,240

(22) Filed: Mar. 27, 2003

(65) Prior Publication Data

US 2003/0183375 A1 Oct. 2, 2003

Related U.S. Application Data

(60) Provisional application No. 60/369,168, filed on Mar. 29, 2002.

(51) Int. Cl.
*F28D 1/06* (2006.01)

(52) U.S. Cl. .............................. 165/132; 165/10

(58) Field of Classification Search .................. 165/10, 165/45, 61–63, 132, 104.17; 252/70
See application file for complete search history.

(56) References Cited

U.S. PATENT DOCUMENTS

| | | | |
|---|---|---|---|
| 4,193,271 A | | 3/1980 | Honigsbaum |
| 4,283,925 A | | 8/1981 | Wildfeuer |
| 4,608,309 A | | 8/1986 | Loh et al. |
| 4,911,232 A | * | 3/1990 | Colvin et al. ............ 165/104.17 |
| 5,255,526 A | * | 10/1993 | Fischer ........................... 62/59 |
| 5,467,812 A | * | 11/1995 | Dean et al. ..................... 165/62 |
| 5,507,337 A | * | 4/1996 | Rafalovich et al. ............ 165/63 |
| 5,525,251 A | * | 6/1996 | Hammond ..................... 252/70 |
| 5,569,642 A | | 10/1996 | Lin |
| 5,678,626 A | * | 10/1997 | Gilles ............................ 165/62 |
| 5,682,752 A | * | 11/1997 | Dean ............................... 62/59 |
| 5,706,888 A | * | 1/1998 | Ambs et al. .................. 165/155 |
| 5,765,389 A | | 6/1998 | Sayler |
| 5,871,041 A | * | 2/1999 | Rafalovich et al. ............ 165/10 |
| 5,944,089 A | * | 8/1999 | Roland ........................... 165/10 |
| 6,047,106 A | | 4/2000 | Sayler |
| 6,059,016 A | * | 5/2000 | Rafalovich et al. ............ 165/10 |

(Continued)

FOREIGN PATENT DOCUMENTS

JP 2000-130803 * 5/2000

OTHER PUBLICATIONS

Ahuja, A. S., "Augmentation of Heat Transport in Laminar Flow of Polystyrene Suspensions. I. Experiments and Results", *Journal of Applied Physics*, vol. 46, No. 8, (Aug. 1975), pp. 3408-3416.

(Continued)

*Primary Examiner*—Teresa J. Walberg
(74) *Attorney, Agent, or Firm*—Dorsey & Whitney LLP

(57) ABSTRACT

A PCM system and method of shifting peak electrical load is provided with a PCM system including a heat exchanger, a storage tank coupled to the heat exchanger for storing PCM slurry, a pump coupled to the heat exchanger, an air conditioning unit coupled to the heat exchanger, and a heat rejection unit coupled to the storage tank. The PCM slurry is pumped from the storage tank to the heat exchanger. The energy at the heat exchanger is absorbed by the PCM slurry, and the PCM slurry is then returned to the storage tank. The energy absorbed by the PCM is rejected from the storage tank to a ground loop or by an air conditioning unit during a non-peak or less load demand period.

14 Claims, 3 Drawing Sheets

U.S. PATENT DOCUMENTS

| | | | |
|---|---|---|---|
| 6,255,256 B1 | 7/2001 | Van Slyke | |
| 6,284,158 B1 | 9/2001 | Marshall et al. | |
| 6,393,861 B1* | 5/2002 | Levenduski et al. | 165/10 |
| 2004/0194478 A1* | 10/2004 | Maeda et al. | 62/93 |

OTHER PUBLICATIONS

Ahuja, A. S., "Augmentation of Heat Transport in Laminar Flow of Polystyrene Suspensions. II. Analysis of the Data", *Journal of Applied Physics*, vol. 46, No. 8, (Aug. 1975), pp. 3417-3425.

Charunyakorn, P. et al., "Forced Convection Heat Transfer in Microencapsulated Phase Change Material Slurries: Flow in Circular Ducts," *Int J Heat Mass Transfer*, vol. 34, No. 3, (1991), pp. 819-833.

Charunyakorn, P., et al., "Forced Convection Heat Transfer in Microencapsulated Phase Change Material Slurries: Flow Between Parallel Plates", ASME HTD-vol. 129, *General Papers: Phase Change and Convective Heat Transfer*, ASME, AIAA/ASME Thermophysics and Heat Transfer Conference, Seattle, Washington, (Jun. 18-20, 1990), pp. 55-62.

Cho, Keumnam, et al., "Thermal Characteristics of Paraffin in a Spherical Capsule During Freezing and Melting Process", *Int J Heat Mass Transfer*, vol. 43 (2000), pp. 3183-3196.

Cho, Young I., et al., "Development of Advanced Low-Temperature Heat Transfer Fluids for District Heating and Cooling", Report No. DOE/CE/26592-2, prepared for the U.S. Department of Energy, Agreement No. DE-FG01-89CE26592, (Mar. 31, 1999), 10 pgs.

Cho, K, et al., "Comparison of Thermal Characteristics of a Test MCM Using Water, PF-5060 and Paraffin Slurry", *EEP-vol.26-2, Advances in Electronic Packaging*, vol. 2, (199), pp. 1499-1505.

Choi, E., et al., Effects of Emulsifier on Particle Size of a Phase Change Material in a Mixture with Water, *International Communications in Heat and Mass Transfer*, vol. 18, (1991), pp. 759-766.

Choi, E, et al., "Forced Convection Heat Transfer with Phase-Change-Material Slurries: Turbulent Flow in a Circular tube", *Int J Heat and Mass Transfer*, vol. 37, No. 2, (1994), pp. 207-215.

Cho, E., et al., "A Novel Concept for Heat Transfer Fluids Used in District Cooling Systems", *ASHRAE Transactions*, vol., 97, (IN-91-6-1), pt. 2, (1991) pp. 653-658.

Colvin, D.P., "Microencapsulated Phase-Change Materials for Storage of Heat", *NASA Tech Briefs*, (Jul. 1989), p. 72.

Colvin, D.P., et al., "Thermal Management of Electronic Systems Using Diamond Heat Spreaders and Microencapsulated PCM Coolants", Paper No. AIAA 97-3888, National Heat Transfer Conference, Baltimore, MD, (Aug. 1997), 4 pages.

Colvin, D.P., et al., "Enhanced Heat Transport in Environmental Systems using Microencapsulated Phase Change Materials", SAE Technical Paper Series No. 911224, 22nd International Conference on Environmental Systems, Seattle, WA, (Jul. 13-16), 11 pages.

Datta, P., et al., "Natural Convection Heat Transfer in an Enclosure with Suspensions of Microencapsulated Phase Change Materials", General Papers in Heat Transfer, HTD-vol. 204, (1992), pp. 133-144.

Goel, M., et al., "Laminar Forced Convection Heat Transfer in Microencapsulated Phase Change Material Suspensions", *Int J heat Mass Transfer*, vol. 37, No. 4 (1994), pp. 593-604.

Inaba, H., et al., "Flow and Cold Heat-Storage Characteristics of Phase-Change Emulsion in a Coiled Double-Tube Heat Exchanger", *Transactions of the ASME*, vol. 117,(May 1995), pp. 440-446.

Inaba, H., et al., "Cold Heat-Release Charateristics of Phase-Change Emulsion by Air-Emulsion Direct-Contact Heat Exchange Method", *Int. J Heat Mass Transfer*, vol. 39, No. 9, pp. 1797-1803.

Inaba, H., et al., "Fundamental Study of Cold Heat-Storage System of O/W-Type Emulsion Having Cold Latent-Heat—Dispersion Material. Part 1.", *Heat Transfer—Japanese Research*, vol. 23, No. 3, (1994), pp. 292-312.

Inaba, H., et al., "Fundamental Study on Latent Cold Heat Storage by Means of Direct-Contact-Freezing Between Oil Droplets and Cold Water Solution", *Journal of Heat Transfer*, vol. 118, (Aug. 1996), pp. 799-801.

Inaba, H., et al., A Measurement of Interfacial Tension Between Tetradecane and Ethylene Glycol Water Solution by Means of Pendant Drop Method, *Fluid Phase Equilibria*, vol. 125, (1996), pp. 159-168.

Inaba, H., et al., "Fundamental Study of Latent Cold Heat Energy Storage by Means of Oil Droplets at Low Freezing Point", *JSME International Journal, Series B.*, vol. 41, No. 3 (1998), pp. 641-649.

Inaba, H., et al., Latent Cold Heat Energy Storage Characteristics, by Means of Direct-Contact-Freezing Between Oil Droplets and Cold Water Solution, *Int. J. Heat Mass Transfer*, vol. 40, No. 13 (1997), pp. 3189-3200.

Kasza, K.E, et al., Improvement of the Performance of Solar Energy or Waste Heat Utilization Systems by Using Phase-Change Slurry as an Enhanced Heat-Transfer Storage Fluid, *Journal of Solar Energy Engineering*, vol. 107, (Aug. 1985), pp. 229-236.

Mulligan, J.C., "Phase-Change Heat-Storage Module", *NASA Tech Briefs*, (Apr. 1989), p. 103.

Mulligan, J.C., et al., "Microencapsulated Phase-Change Material Suspensions for Heat Transfer in Spacecraft Thermal Systems", *Journal of Spacecraft and Rockets*, vol. 33, No. 2, (Mar.-Apr. 1996), pp. 278-284.

Roy, S., et al., "An Evaluation of Phase Change Microencapsules for Use in Enhanced Heat Transfer Fluids", *Int. Comm. Heat Mass Transfer*, vol. 18, (1991), pp. 495-507.

Sohn, C.W., et al., "Heat Transfer Enhancement in Laminar Slurry Pipe Flows with Power Law Thermal Conductives", *Int. J Heat Mass Transfer*, vol. 106, (Aug. 1984), pp. 539-541.

Sozen, Zeki Z., et al., "Thermal Energy Storage by Agitated Capsules of Phase Change Material. 2. Causes of Efficiency Loss", *Ind. Eng. Chem. Research*, vol. 27, No. 4, (1988), pp. 684-691.

Sozen, Zeki, Z, et al., Thermal Energy Storage by Agitated Capsules of Phase Change Material. 1. Pilot Scale Experiments, *Ind. Eng. Chem. Research*, vol. 27, No. 4, (1988), pp. 679-684.

Vogel, M.R., "Thermal Performance for Miniature Heat Sink Cooled by MicroPCM Slurry", *Advances in Electronic Packaging, EEP-vol. 10-2, ASME*, (1995), p. 989.

Yamagishi, Y., et al., "Characteristics of Microencapsulated PCM Slurry as a Heat-Transfer Fluid", *AichE Journal*, col. 45, No. 4, (1999), pp. 696-707.

Yamagishi, Y. et al., "An Evaluation of Microencapsulated PCM for Use in Cold Energy Transportation Medium", IEEE, (1996), pp. 2077-2083.

* cited by examiner

PCM (PHASE CHANGE MATERIAL) SYSTEM AND METHOD FOR SHIFTING PEAK ELECTRICAL LOAD

CROSS-REFERENCE TO RELATED APPLICATION

This is a utility patent application which claims priority of U.S. provisional patent application Ser. No. 60/369,168, filed Mar. 29, 2002; subject matter of which is incorporated herewith by reference.

FIELD OF THE INVENTION

The present invention relates generally to peak electrical load shifting systems. More particularly, the present invention relates to a Phase Change Material ("PCM") system capable of shifting peak electrical load.

BACKGROUND OF THE INVENTION

Peak electrical demand is heavily dependent on air conditioning (A/C) loads. Summer 2000 in California demonstrated the seriousness of the peak electrical demand problem. Peak A/C loads played a key role in driving up electrical demand, which caused power outages and raised electricity rates.

Previous research has been conducted on the use of PCM slurries for electronics cooling and for district beating and cooling. However, the research has found that these PCM slurries are not suitable and too expensive to be used for shifting peak electrical load. PCM slurry flows have been researched by a number of individuals.

For example, D. P. Colvin, et al., S. K. Roy, et al., and researchers in Japan have studied the use of micro-encapsulated slurries for cooling electronic components in defense applications. A micro-encapsulated particle is where a paraffin material is encapsulated by an outer coating. The outer coating is durable enough to insure that the particles do not coalesce once placed in the water. The drawback of these materials is cost. The cost of the micro-encapsulated particles is on the order of tens of dollars per pound, while the cost of commercial grade paraffins is much less. It is too expansive to be used for shifting peak electrical load type applications. Therefore, paraffin slurries are considered as the first choice for a PCM slurry system.

Choi, Cho, and Lorsch at Drexel University studied the use of PCM slurries for district heating and cooling applications. Recently, Dr. K. Cho in Korea studied the use of PCM slurries for the cooling of multi-chip modules (MCM). These researchers have used slurries with PCM concentrations ranging from 5 to 30 percent. Higher PCM concentrations lead to smaller storage tank requirements.

Therefore, it is desirable to develop a PCM slurry mixture with a higher PCM concentration, for example 30–40 percent or more.

SUMMARY OF THE INVENTION

To solve the above and the other problems, the present invention provides a PCM system and method of alleviating peak electrical demand due to high A/C loads. The present invention further provides a PCM slurry mixture with a high PCM concentration, e.g. 40 percent or more.

One of the advantages of using a paraffin slurry is the increase in specific heat of the fluid over a small temperature range. This increase leads to the ability to store large amounts of energy in a smaller volume of fluid.

Another advantage of using a paraffin slurry is to enhance the heat transfer off of surfaces. The particles interact with the boundary layer and have been found to increase the heat transfer rate by 30 percent or more. The combination of these characteristics leads to a small compact heat transfer system that can store significant amounts of energy. The advantage of using the fluid is in its ability to store large amounts of energy for small temperature changes. This characteristic gives the mixture the increased heat capacity.

These and other advantages of the present invention will become apparent to those skilled in the art from the following detailed description, wherein is shown and described illustrative embodiments of the invention, including best modes contemplated for carrying out the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE PREFERRED EMBODIMENTS

Figure 1:
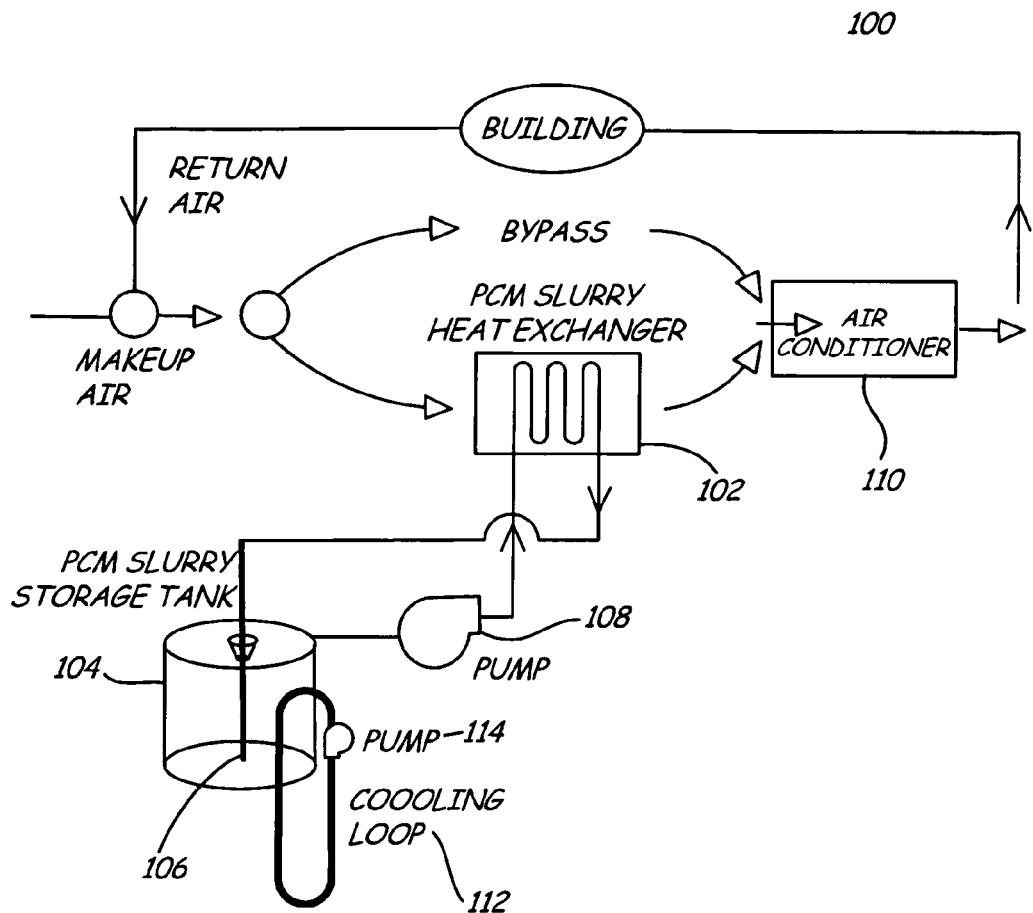
FIG. 1 illustrates one embodiment of a PCM system adapted for an air conditioning unit in accordance with the principles of the present invention.

In the following description of a preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

For purposes of explanation, numerous specific details are set forth in the following description in order to provide a thorough understanding of the present invention. However, it will be evident to one of ordinary skill in the art that the present invention may be practiced without some of these specific details.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiments, wherein these innovative teachings are advantageously applied to the particular problems of a PCM system and method for shifting peak electrical load. However, it should be understood that these embodiments are only examples of the many advantageous uses of the innovative teachings herein. In general, statements made in the specification of the present application do not necessarily limit any of the various claimed inventions.

Moreover, some statements may apply to some inventive features but not to others. In general, unless otherwise indicated, singular elements may be in the plural and visa versa with no loss of generality.

The following terms are particularly described throughout the description:

PCM Not Limitive

Throughout the discussion herein there will be examples that make reference to PCM (Phase Change Material). The present invention does not recognize any limitations in regards to what types of PCM may be used in affecting the teachings of the present invention. One skilled in the art will recognize that any suitable PCM may be used with no loss of generality in implementing the teachings of the present invention.

Temperature Not Limitive

The present invention solves the problem of shifting peak electrical load in a high temperature that demands A/C cooling. The present teachings do not limit to a specific temperature range. The system and method of the present invention is capable of shifting peak electrical load in a variety of temperature ranges including in a low temperature that demands A/C heating, or a temperature range suitable for heating applications. Thus, while this specification speaks in terms of 'temperature' or 'temperature change', these terms should be interpreted broadly to include any suitable temperature range.

Exemplary Embodiment

As shown in FIG. 1, one embodiment of a PCM system 100 for shifting peak electrical load adapted for an air conditioning system, comprises a heat exchanger 102, a storage tank 104 coupled to the heat exchanger 102 for storing PCM slurry 106, a pump 108 coupled to the heat exchanger 102 for pumping the PCM slurry 106 to the heat exchanger 102, the heat exchanger 102 exchanging energy with an air conditioning unit 110 and returning the PCM slurry 106 to the storage tank 104, and a heat rejection unit 112 for rejecting energy from the storage tank 104.

The PCM slurry comprises a mixture of water, emulsifier, and paraffin, that absorbs peak A/C loads. The PCM system 100 is disposed inline with the air conditioning unit 110. Returning air from the air conditioning unit 110 is passed through the heat exchanger 102 of the PCM system 100 prior to returning to the air conditioning unit 110. The air is pre-cooled as it passes through the heat exchanger 102 of the PCM system 100, hence decreasing the thermal load to the air conditioning unit 110. This decrease in thermal load reduces the electrical demand of the air conditioning unit 110. The PCM slurry absorbs the energy from the air stream as the PCM undergoes a change of phase (latent heat of fusion). The term "slurry" refers to an aqueous system that comprises an emulsifier and small paraffin particles. In one embodiment, the emulsifier is included in the aqueous solution to insure that the small paraffin particles do not coalesce.

The PCM slurry is a high concentration PCM slurry that can be pumped through the heat exchanger 102 and stored in the storage tank 104. The PCM is selected to allow for large amount of energy to be absorbed by the PCM in relatively small volumes. The PCM slurry 106 is pumped in a continuous loop from the storage tank 104 through the heat exchanger 102 and back to the storage tank 104. In some embodiments, the PCM slurry acts as a heat sink to the airflow in the air conditioning unit 110.

Figure 2:
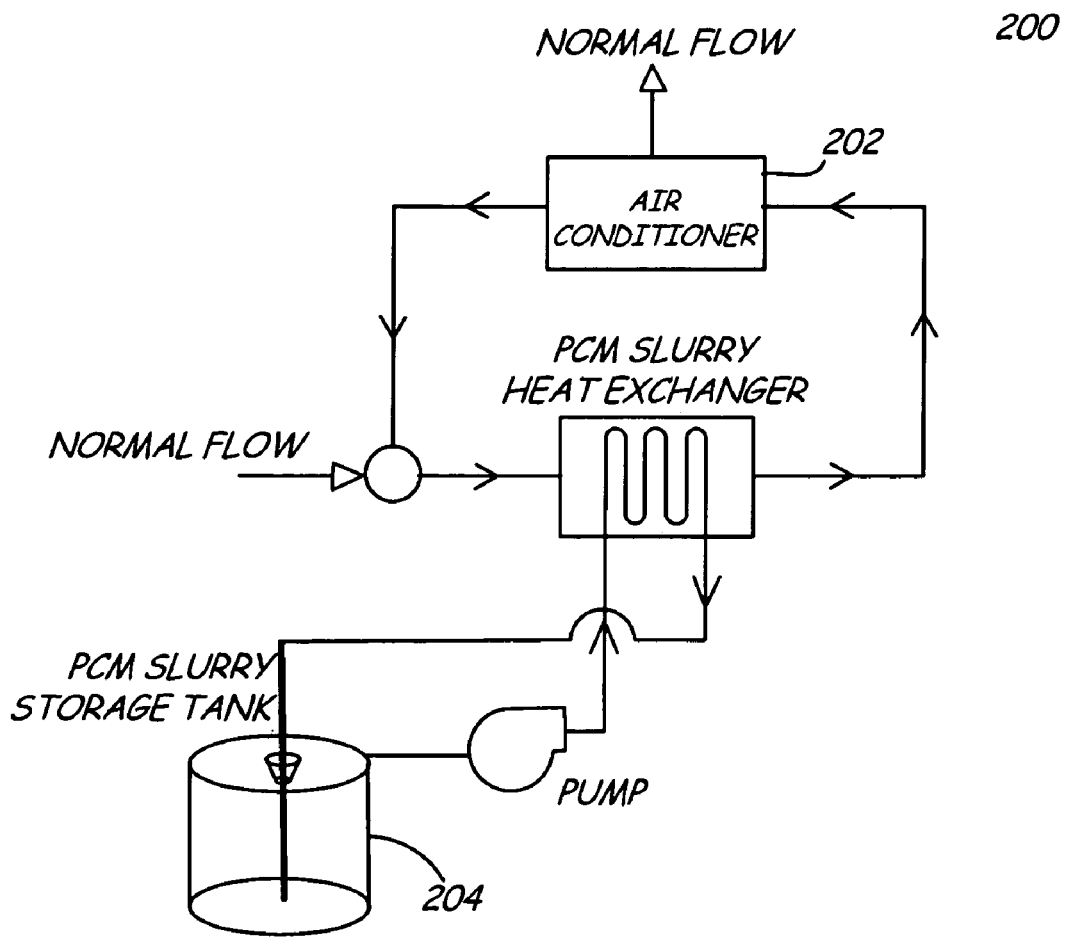
FIG. 2 illustrates another embodiment of a PCM system adapted for an air conditioning unit in accordance with the principles of the present invention.

All of the energy absorbed by the PCM system 100 is rejected. The heat rejection path can be a ground loop or earth, or a cold air stream. In one embodiment as shown in FIG. 1, a pump 114 is used to pump the slurry from the storage tank through a ground loop 112 and reject the energy absorbed to the ground loop, and pump the slurry back to the storage tank 104. In another embodiment 200 as shown in FIG. 2, the air conditioning unit 202 may be used to re-solidify the PCM 204 during a non-peak or less load demand period.

One advantage of the present invention is that the energy costs of operating the PCM system are significantly less than operating a traditional A/C system. The decrease in peak load leads to a decrease in electrical demand by the A/C systems. The unique feature of the PCM system in accordance with the present invention is its ability to absorb peak A/C loads, low operating costs, and a simple system design that leads to high system reliability. The PCM system of the present invention can be retrofitted into existing homes or installed in new homes. The PCM system decreases peak energy demand so that it decreases the total electrical costs to the consumer.

PCM Slurry

Figure 3:
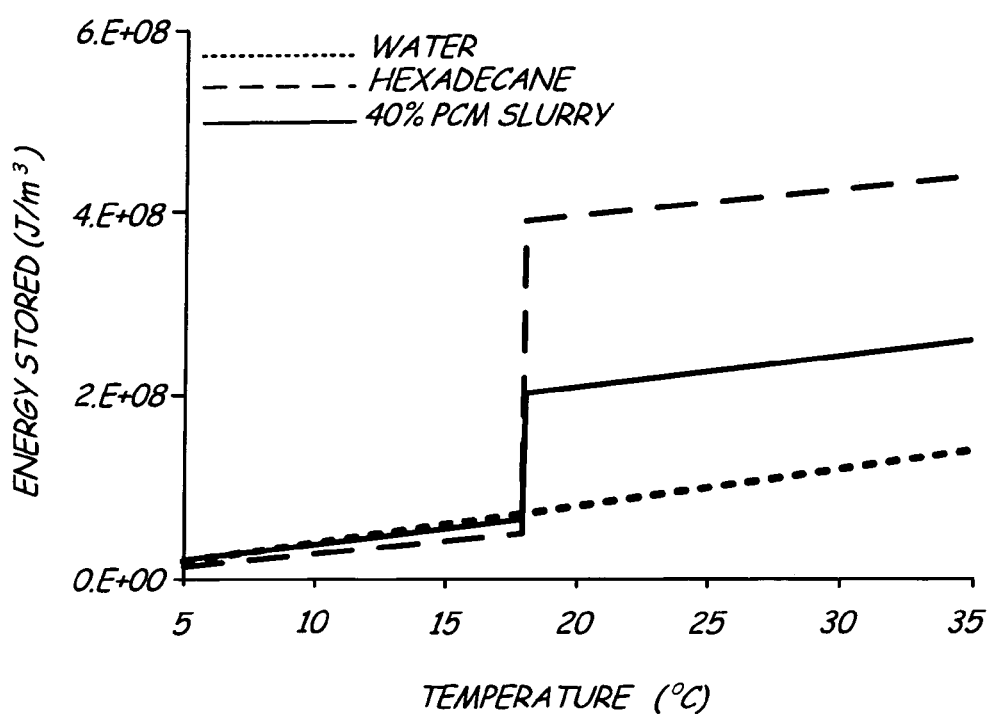
FIG. 3 illustrates a schematic view of energy storage characteristics of a 40 percent slurry mixture compared to the pure paraffin and water.

The PCM slurry generally consists of water, an emulsifier, and a hydrocarbon. In one embodiment, the PCM slurry in the peak shifting system of the present invention is a composition of water, Triton™, and hexadecane. Compositions have ranged from 10 to 50 percent hexadecane. The amount of Triton™ is a percentage of the total hydrocarbon concentration. Concentration of the Triton ranged from ½ to 4 percent. For example, a 40 percent solution with 1 percent Triton™ would consist of 40 liters of hexadecane, 60 liters of water, and 0.40 liters of Triton™. The proper composition is provided to insure that the solution remains as an "oil-water" mixture. Researchers have been unable to develop a solution that remained stable for long periods of time. The "droplets" of oil would coalesce and recombine at the top of the container. In a stable solution, a "white" layer of fluid separates from the top of the vessel, with a water layer below. The upper layer remains as a mixture of particles and fluid, not just one complete mass of hydrocarbon. FIG. 3 illustrates energy storage characteristics of a 40 percent slurry mixture compared to the pure paraffin and water in different temperatures.

The average particles range in size from 2 to 20 micrometers. The particle sizes become smaller after they have undergone agitation or pumping. The hexadecane solutions are easily pumped, do not clog the pipes, and remain stable for long periods of time. In one embodiment, the fluid is a milky white color.

Although the present invention has been described with reference to preferred embodiments, persons skilled in the art will recognize that changes may be made in form and detail without departing from the spirit and scope of the invention.

What is claimed is:

1. A PCM system adapted for an air conditioning system, comprising:

a heat exchanger;

a storage tank coupled to the heat exchanger for storing PCM;

a pump coupled to the heat exchanger for pumping the PCM to the heat exchanger;

an air conditioning unit coupled to the heat exchanger, the heat exchanger exchanging energy with the air conditioning unit and returning the PCM to the storage tank; and a heat rejection unit coupled to the storage tank for rejecting energy from the storage tank.

2. The system of claim 1, wherein the PCM system is inline with the air conditioning unit, wherein returning air from the air conditioning unit is passed through the heat exchanger prior to returning to the air conditioning unit.

3. The system of claim 2, wherein air is pre-cooled as the air passes through the heat exchanger.

4. The system of claim 1, wherein the PCM is pumped through the heat exchanger and back to the storage tank.

5. The system of claim 1, wherein the heat rejection unit includes a pump in a ground loop, wherein the pump pumps the PCM from the storage tank through the ground loop and back to the storage tank to reject energy absorbed by the ground loop.

6. The system of claim 1, further comprising a second air conditioning unit to re-solidify the PCM.

7. The system of claim 1, wherein the PCM is a PCM slurry comprising a mixture of water, emulsifier, and paraffin.

8. The system of claim 7, wherein the emulsifier of the PCM slurry is provided to insure that particles of the paraffin do not coalesce.

9. A method of shifting peak electrical load, comprising the steps of:
   providing a PCM system comprising a heat exchanger, a storage tank coupled to the heat exchanger for storing PCM, a pump coupled to the heat exchanger, an air conditioning unit coupled to the heat exchanger, and a heat rejection unit coupled to the storage tank;
   pumping the PCM from the storage tank to the heat exchanger;
   absorbing energy at the heat exchanger;
   returning the PCM to the storage tank; and
   rejecting the energy from the storage tank.

10. The method of claim 9, further comprising the step of passing returning air from the air conditioning unit through the heat exchanger prior to returning to the air conditioning unit.

11. The method of claim 9, further comprising pre-cooling air as the air passes through the heat exchanger.

12. The method of claim 9, wherein the step of rejecting the energy from the storage tank comprises the steps of:
   providing a pump in a ground loop; and
   pumping the PCM from the storage tank through the ground loop and back to the storage tank to reject the energy absorbed by the ground loop.

13. The method of claim 9, further comprising the step of re-solidifying the PCM by a second air conditioning unit.

14. The method of claim 9, wherein the step of pumping the PCM from the storage tank to the heat exchanger comprises the step of pumping a PCM slurry composition adapted for shifting peak electrical load, wherein the composition includes a mixture of water, emulsifier, and paraffin, wherein the emulsifier of the PCM slurry is provided to insure that particles of the paraffin do not coalesce.

* * * * *

UNITED STATES PATENT AND TRADEMARK OFFICE
CERTIFICATE OF CORRECTION

PATENT NO. : 7,096,929 B2  
APPLICATION NO. : 10/400240  
DATED : August 29, 2006  
INVENTOR(S) : Randy Lee Clarksean It is certified that error appears in the above-identified patent and that said Letters Patent is hereby corrected as shown below:

| Col. | Line | | Should Read |
|---|---|---|---|
| 1 | 29 | " beating " | -- heating -- |

Signed and Sealed this

Twenty-third Day of January, 2007

JON W. DUDAS  
*Director of the United States Patent and Trademark Office*